J. Baker.
Cutting Ice.
No 74278. Patented Feb. 11, 1868.
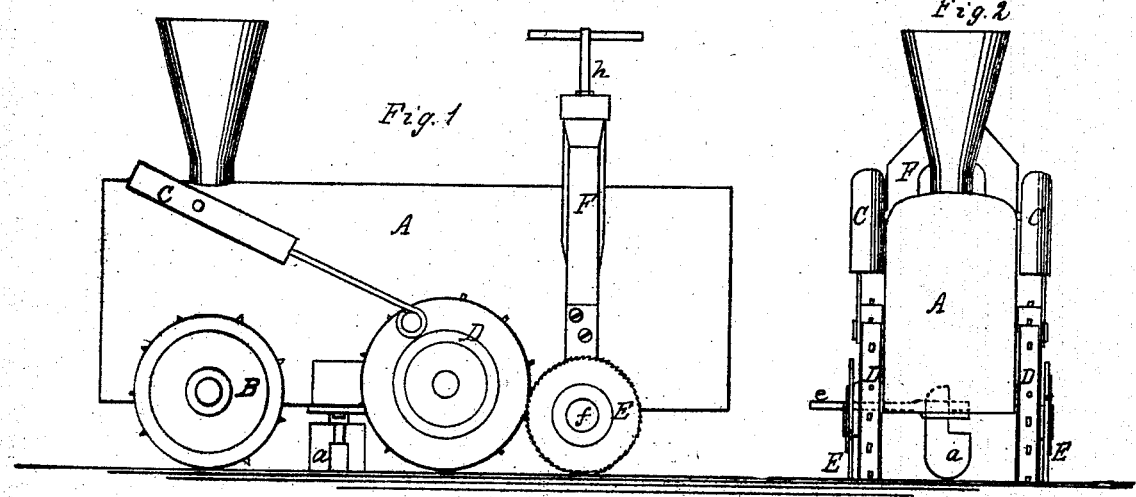
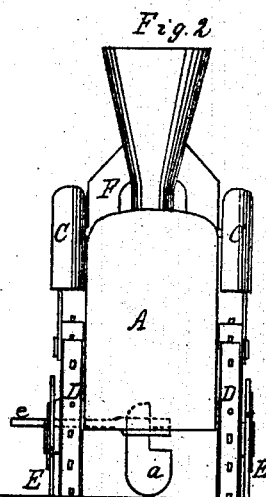
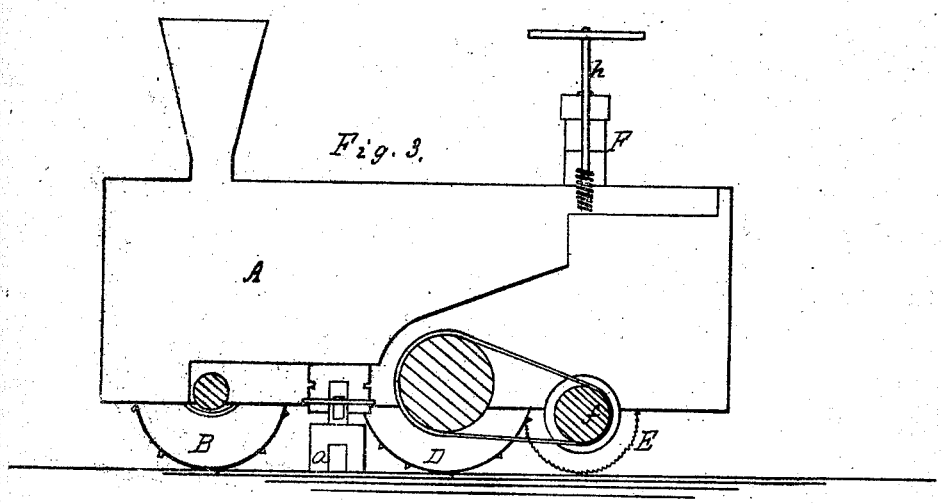
Witnesses
P. H. Dodge
Geo. H. Griebel
Inventor
John Baker
by Dodge Munn
Attorneys

United States Patent Office.

JOHN BAKER, OF PHILADELPHIA, PENNSYLVANIA.

Letters Patent No. 74,278, dated February 11, 1868.

---

IMPROVEMENT IN MACHINE FOR CUTTING ICE.

---

*The Schedule referred to in these Letters Patent and making part of the same.*

---

TO ALL WHOM IT MAY CONCERN:

Be it known that I, JOHN BAKER, of Philadelphia, in the county of Philadelphia, and State of Pennsylvania, have invented certain new and useful Improvements in Ice-Cutting Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the constructing of a machine, to be propelled by a steam-engine, and which, as it travels over the ice, shall operate circular saws at its rear to cut the ice as it moves.

Figure 1 is a side elevation,

Figure 2 an end view, and

Figure 3 a longitudinal vertical section.

I construct a carriage of any suitable size and style, and mount thereon a steam-engine, as represented in the drawings, in which A represents the body, and C an oscillating cylinder, having its piston attached to and operating the driving-wheels D—there being another set of wheels, B, to support the front portion of the carriage—the wheels D being provided with spurs or projections on their periphery, to enable them to take hold on the ice, and prevent slipping. Near the rear end of the machine, a frame, F, is arranged to slide vertically, this frame being arranged to extend down on each side of the carriage, and supporting at its lower end the ends of a horizontal shaft, $f$, on which is secured, at each side of the carriage, a circular saw, E. From the shaft of the driving-wheels D a band passes around the shaft $f$, on which the saws are mounted, so that as the wheels D revolve to propel the machine, motion is thereby imparted to the saws. The frame F is provided with a screw, $h$, or other suitable means for adjusting it vertically, and thereby to raise or lower the saws to cut more or less deep, or to elevate them entirely above the ice, as may be desired. It will of course be necessary to have the machine so geared as to cause the saws to revolve much more rapidly than the wheels D, and it is obvious that instead of a belt, gearing may be used if preferred.

In order to elevate the wheels so that the machine may be turned, I locate under its centre a lever-jack, having its lower portion, $a$, rounded, as shown in fig. 2, and having its upper portion pivoted in the machine or carriage, so that when the lever $e$ is depressed the carriage will be raised and rest on the part $a$, and when thus raised the machine may be turned on the pivot.

With a machine constructed and operating on the plan thus described, it will be seen that the ice can be cut with great rapidity and ease.

Having thus described my invention, what I claim, is—

1. A traction-engine, carrying and operating saws for cutting ice, substantially as described.

2. So arranging the saws E, in connection with the ice-cutting machine, that they may be adjusted vertically, for cutting to a greater or less depth, as may be desired, substantially as set forth.

3. The swivelled lever-jack $a$, located under the body of the machine, in such a position and manner that the machine may be raised and turned thereon, substantially as set forth.

JOHN BAKER.

Witnesses:
A. H. TIPPIN,
LEWIS H. TRIMBLE.